US012698823B2

(12) United States Patent
Shimoyoshi et al.

(10) Patent No.: US 12,698,823 B2
(45) Date of Patent: Aug. 4, 2026

(54) ROCKING TABLE

(71) Applicant: NIPPON THOMPSON CO., LTD., Tokyo (JP)

(72) Inventors: Hiroaki Shimoyoshi, Toki (JP); Satoru Kato, Toki (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 19/120,272

(22) PCT Filed: Aug. 7, 2023

(86) PCT No.: PCT/JP2023/028732
§ 371 (c)(1),
(2) Date: Apr. 11, 2025

(87) PCT Pub. No.: WO2024/095552
PCT Pub. Date: May 10, 2024

(65) Prior Publication Data
US 2026/0146665 A1 May 28, 2026

(30) Foreign Application Priority Data
Oct. 31, 2022 (JP) ................................. 2022-174481

(51) Int. Cl.
*F16H 25/16* (2006.01)
*F16H 25/18* (2006.01)

(52) U.S. Cl.
CPC ............. *F16H 25/16* (2013.01); *F16H 25/18* (2013.01)

(58) Field of Classification Search
CPC ........ F16H 37/122; F16H 25/16; F16H 25/18; B25J 9/0096
See application file for complete search history.

(56) References Cited

U.S. PATENT DOCUMENTS 12,528,144 B2 * 1/2026 Nishiki ................... B23Q 1/64
2023/0183940 A1 * 6/2023 Hisada ................... E02F 9/006

FOREIGN PATENT DOCUMENTS

JP        H08-211173 A     8/1996
JP        2001-099254 A    4/2001
(Continued)

OTHER PUBLICATIONS

Oct. 17, 2023 International Search Report issued in International Patent Application No. PCT/JP2023/028732.

*Primary Examiner* — Minnah L Seoh
*Assistant Examiner* — Gregory T Prather
(74) *Attorney, Agent, or Firm* — Oliff PLC

(57) ABSTRACT

A rocking table includes a base portion, a linear motion mechanism including a rail attached to the base portion and a slider relatively movably attached to the rail, a driving source causing the slider to perform a linear reciprocating motion, a first support portion attached to the slider and performing a linear reciprocating motion together with the slider, a first rolling bearing attached to the first support portion, a table portion capable of performing a rocking motion with power transmitted from the driving source, a second support portion supporting the table portion, a second rolling bearing attached to the second support portion, and an eccentric shaft including a first shaft portion and a second shaft portion arranged eccentrically with respect to the first shaft portion, the first shaft portion being supported by the first rolling bearing, the second shaft portion being supported by the second rolling bearing.

14 Claims, 14 Drawing Sheets

(56) References Cited

FOREIGN PATENT DOCUMENTS

| JP | 2008-240773 A | 10/2008 | | |
| JP | 2013-103303 A | 5/2013 | | |
| JP | 2017-095194 A | 6/2017 | | |
| WO | WO-2022034647 A1 * | 2/2022 | ......... | B23Q 11/0021 |

* cited by examiner

ROCKING TABLE

TECHNICAL FIELD

The present disclosure relates to a rocking table. The present application claims priority based on Japanese Patent Application No. 2022-174481 filed on Oct. 31, 2022, the entire contents of which are incorporated herein by reference.

BACKGROUND ART

A sliding device consisting of a base body and a sliding body is known (see, e.g., Patent Literature 1). The sliding device disclosed in Patent Literature 1 uses an engaging body, such as a worm or a pinion, as a driving system. Rack teeth engaging with the engaging body are formed on a first sliding member side fixed to the base body or on a second sliding member side fixed to the sliding body.

CITATION LIST

Patent Literature

Patent Literature 1: Japanese Patent Application Laid-Open No. 2001-99254

SUMMARY OF INVENTION

Technical Problem

In the rocking tables (for example, goniometric stages), the conventional driving system adopting a worm gear has the following problems. Since the driving system adopting a worm gear utilizes a so-called sliding mechanism for driving, it is difficult to calculate the life of the device. Further, since the device has a configuration with gaps, backlash occurs, making it extremely difficult to position the table portion accurately. Still further, there is a limit to the high-speed operation of the device.

In view of the foregoing, one of the objects is to provide a rocking table that facilitates life calculation, enables accurate positioning of the table portion, and allows appropriate high-speed operation.

Solution to Problem

A rocking table according to the present disclosure includes: a base portion; a linear motion mechanism including a rail attached to the base portion and a slider relatively movably attached to the rail; a driving source causing the slider to perform a linear reciprocating motion; a first support portion attached to the slider and performing a linear reciprocating motion together with the slider; a first rolling bearing attached to the first support portion; a table portion capable of performing a rocking motion with power transmitted from the driving source; a second support portion supporting the table portion; a second rolling bearing attached to the second support portion; and an eccentric shaft including a first shaft portion and a second shaft portion arranged eccentrically with respect to the first shaft portion, the first shaft portion being supported by the first rolling bearing, the second shaft portion being supported by the second rolling bearing.

Advantageous Effects of Invention

The rocking table described above facilitates life calculation, enables accurate positioning of the table portion, and allows appropriate high-speed operation.

DESCRIPTION OF EMBODIMENTS

Outline of Embodiments

Figure 1:
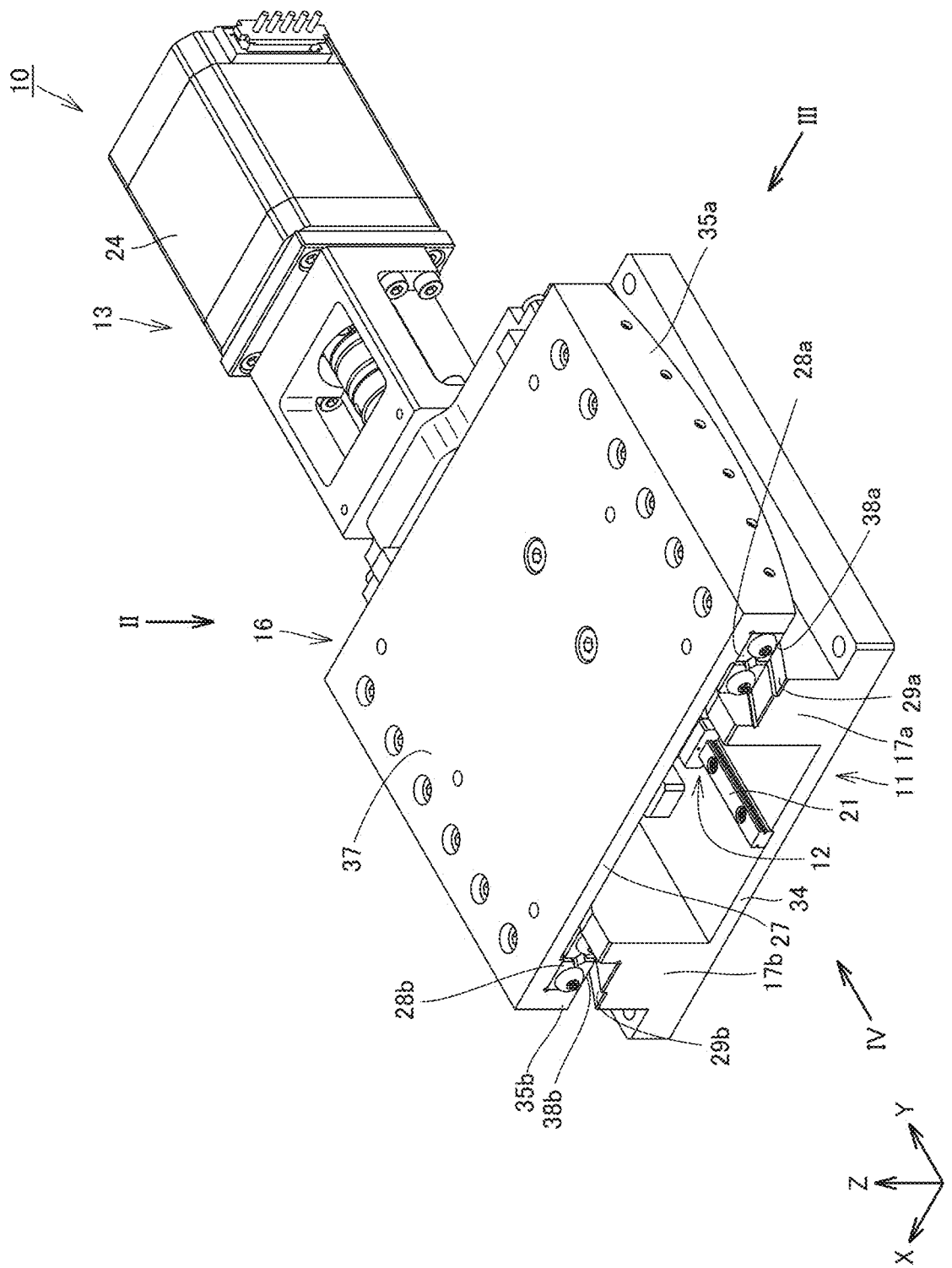
FIG. 1 is a schematic perspective view of a rocking table of Embodiment 1 of the present disclosure.

A rocking table of the present disclosure includes: a base portion; a linear motion mechanism including a rail attached to the base portion and a slider relatively movably attached to the rail; a driving source causing the slider to perform a linear reciprocating motion; a first support portion attached to the slider and performing a linear reciprocating motion together with the slider; a first rolling bearing attached to the first support portion; a table portion capable of performing a rocking motion with power transmitted from the driving source; a second support portion supporting the table portion; a second rolling bearing attached to the second support portion; and an eccentric shaft including a first shaft portion and a second shaft portion arranged eccentrically with respect to the first shaft portion, the first shaft portion being supported by the first rolling bearing, the second shaft portion being supported by the second rolling bearing.

According to the rocking table of the present disclosure, the slider included in the linear motion mechanism performs a linear reciprocating motion with the power from the driving source. The first support portion attached to the slider performs a linear reciprocating motion together with the slider. Then, the table portion attached to the second support portion via the eccentric shaft performs a rocking motion in conjunction with the linear reciprocating motion of the first support portion. Here, the first shaft portion of the eccentric shaft is supported by the first rolling bearing, and the second shaft portion of the eccentric shaft is supported by the second rolling bearing. Such a configuration, unlike the sliding mechanism, facilitates life calculation based on fatigue of rolling elements and the like. Further, since the configuration adopts the first and second rolling bearings, unlike the case of the driving system adopting a worm gear, gaps do not occur, which makes it possible to perform accurate positioning of the table portion, and it is also suitable for high-speed operation. Accordingly, such a rocking table facilitates life calculation, enables accurate positioning of the table portion, and allows appropriate high-speed operation. Here, accurate positioning of the table portion means that the tilt angle of the table portion, tilted by the rocking motion, can be accurately determined.

In the above rocking table, the linear motion mechanism may include a linear motion guide unit. This allows the table portion to rock smoothly, and also enables more accurate positioning.

In the above rocking table, at least one of the first rolling bearing and the second rolling bearing may include an angular bearing. This makes it possible to smoothly rock the table portion while properly supporting the eccentric shaft, thereby enabling accurate life calculation.

In the above rocking table, the driving source may include a ball screw having a ball screw nut attached to the first support portion and a screw shaft, and a motor operable to rotate the screw shaft. This makes it possible to convert the rotational motion of the motor into the linear motion of the slider to rock the table portion more smoothly, and also to control the rotation of the motor to enable high-speed operation and accurate positioning.

In the above rocking table, in the case where the table portion is horizontal as viewed in a horizontal direction, a direction in which a virtual line segment connecting a center of the first shaft portion and a center of the second shaft portion extends may be horizontal. This makes it possible to ensure the stability of the rocking table when the table portion is in a horizontal position.

In the above rocking table, a plurality of the sliders may be provided. With this, the plurality of sliders can ensure an accurate linear reciprocating motion of the first support portion, thereby enabling more accurate positioning and high-speed operation.

In the above rocking table, the table portion may include a sliding portion having a sliding surface composed of a curved surface. The base portion may include a guide portion that guides the table portion, the guide portion having a guide surface that is composed of a curved surface and is in contact with the sliding surface. With this, the sliding portion having the sliding surface and the guide portion having the guide surface enable a smoother rocking motion of the table portion.

In the above rocking table, a pair of the guide portions may be provided to sandwich the rail therebetween. This makes it possible to guide the rocking table portion more appropriately.

SPECIFIC EMBODIMENTS

Specific embodiments of the rocking table of the present disclosure will be described below with reference to the drawings. In the drawings referenced below, the same or corresponding portions are denoted by the same reference numerals and the description thereof will not be repeated.

Embodiment 1

Figure 2:
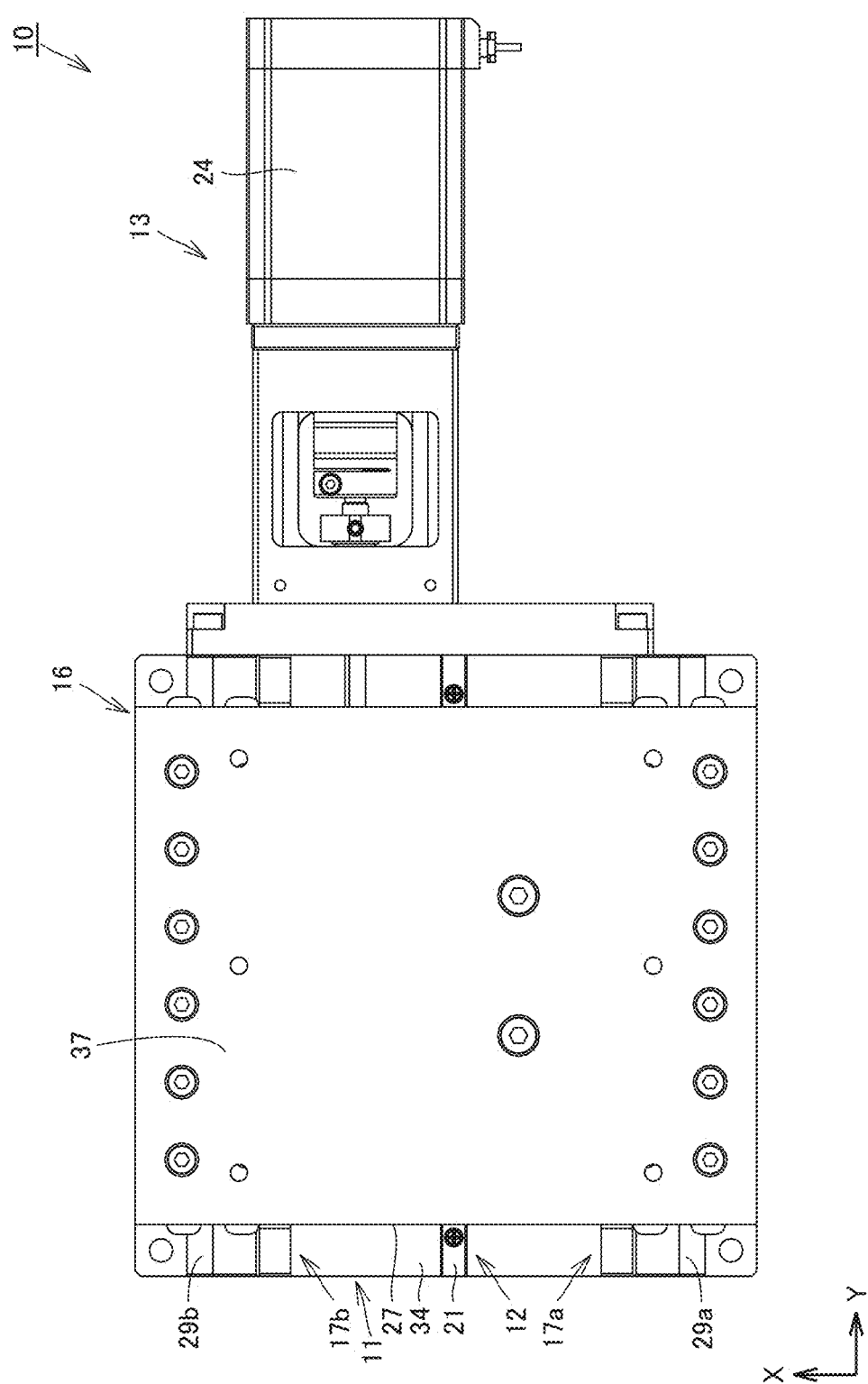
FIG. 2 is a schematic plan view of the rocking table shown in FIG. 1.
Figure 3:
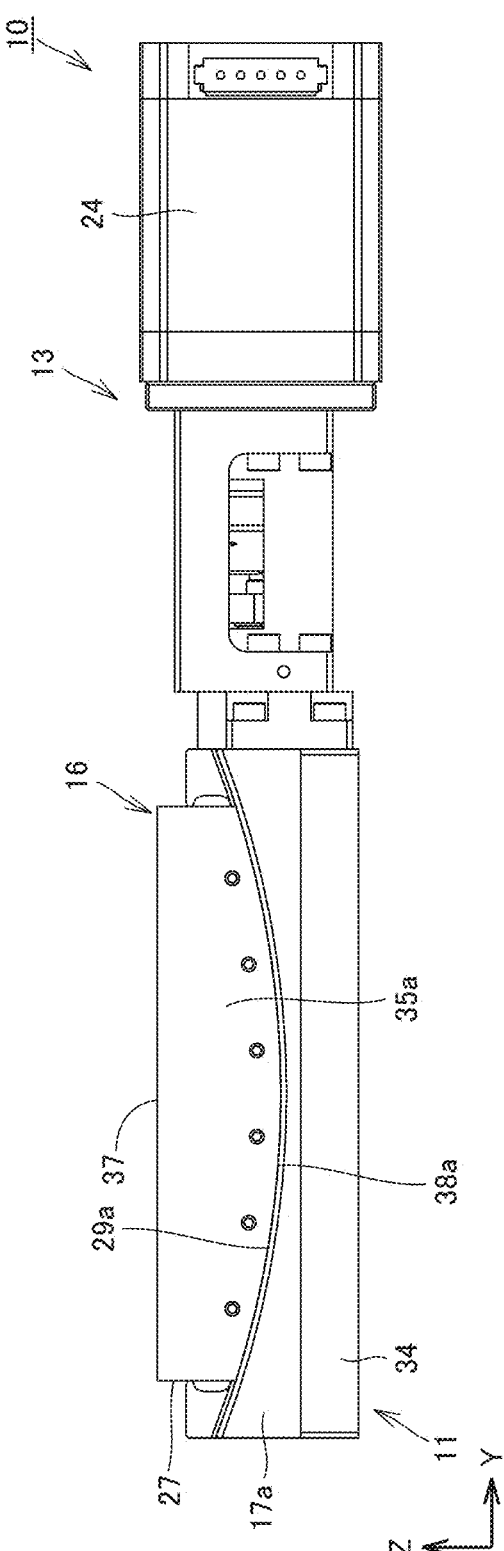
FIG. 3 is a schematic side view of the rocking table shown in FIG. 1.
Figure 4:
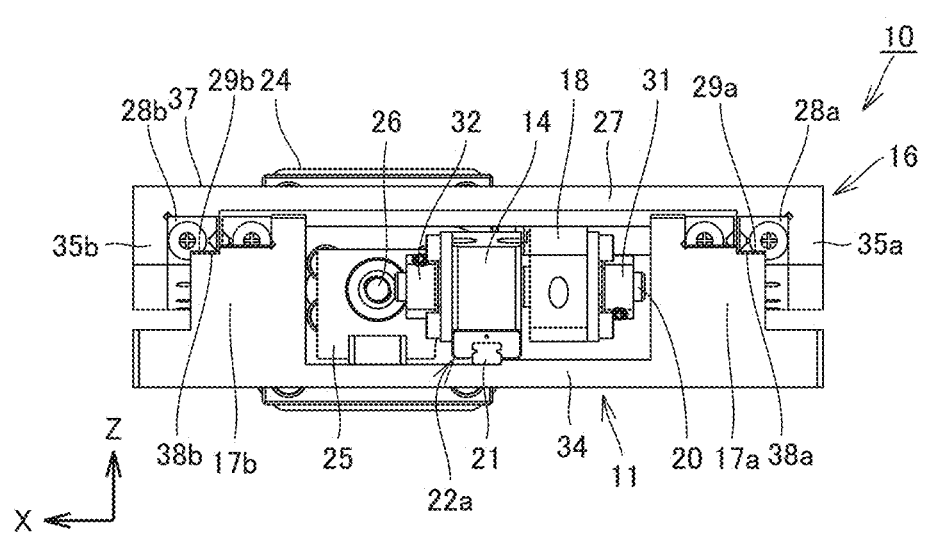
FIG. 4 is a schematic front view of the rocking table shown in FIG. 1.

One embodiment of the present disclosure, Embodiment 1, will be described first. FIG. 1 is a schematic perspective view of a rocking table of Embodiment 1 of the present disclosure. In FIG. 1 and the following figures, the Y direction is the direction in which a rail, described later, extends, which indicates the longitudinal direction of the rocking table, the X direction indicates the short direction of the rocking table, and the Z direction indicates the thickness direction (height direction) of the rocking table. The X, Y, and Z directions are orthogonal to each other. FIG. 2 is a schematic plan view of the rocking table shown in FIG. 1. FIG. 2 is a view of the rocking table shown in FIG. 1 in a direction indicated by arrow II. FIG. 3 is a schematic side view of the rocking table shown in FIG. 1. FIG. 3 is a view of the rocking table shown in FIG. 1 in a direction indicated by arrow III. FIG. 4 is a schematic front view of the rocking table shown in FIG. 1. FIG. 4 is a view of the rocking table shown in FIG. 1 in a direction indicated by arrow IV.

Figure 5:
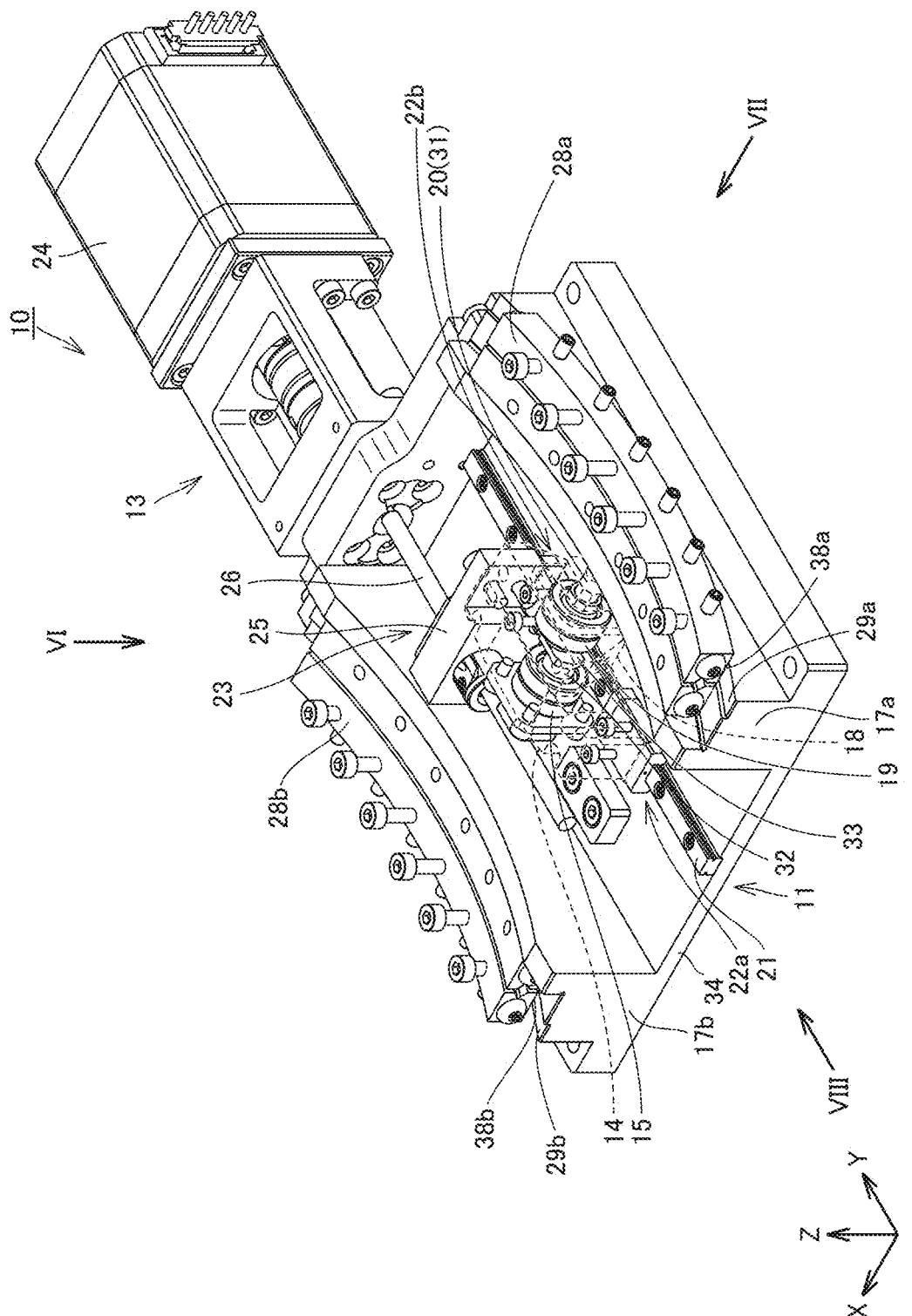
FIG. 5 is a schematic perspective view of the rocking table of Embodiment 1 in the state in which a table portion, described later, has been removed, with some members represented by dashed lines.
Figure 6:
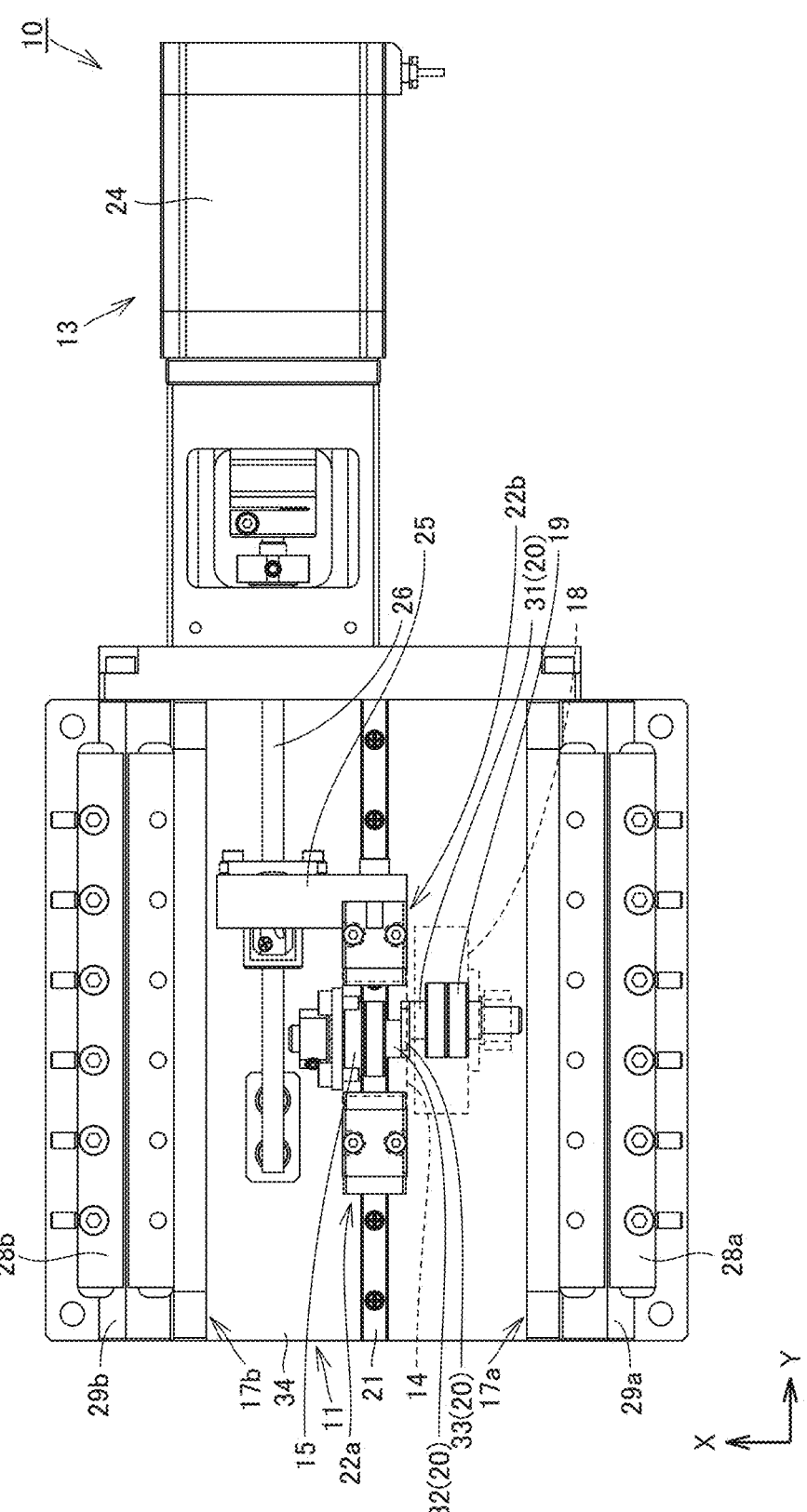
FIG. 6 is a schematic plan view of the rocking table shown in FIG. 5.
Figure 7:
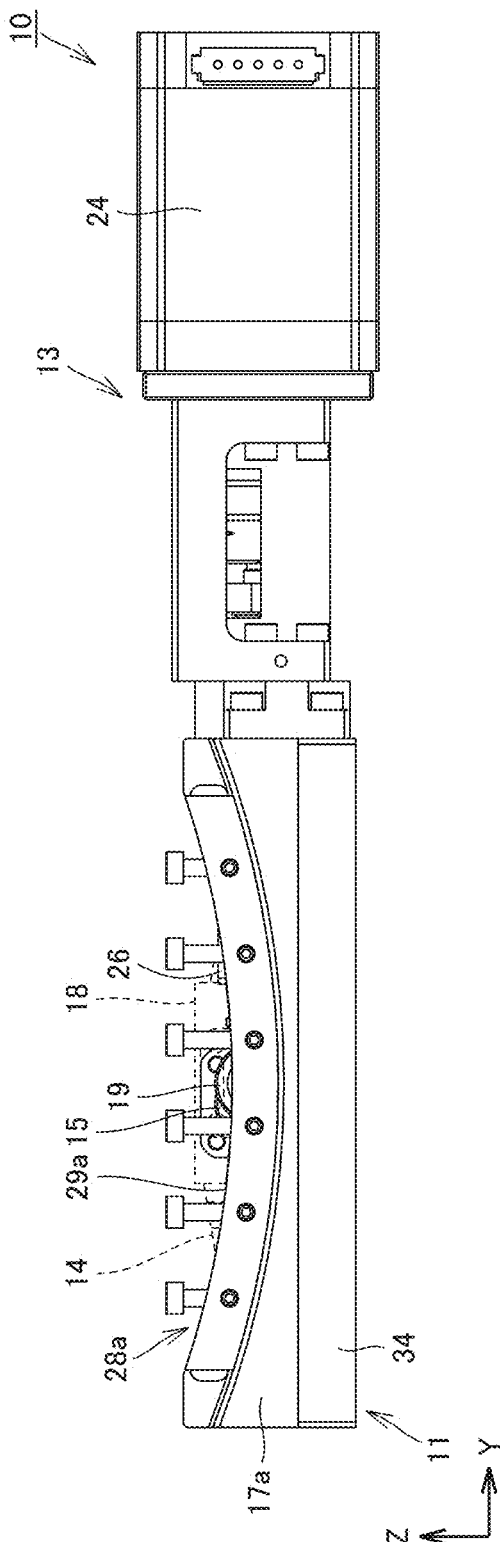
FIG. 7 is a schematic side view of the rocking table shown in FIG. 5.
Figure 8:
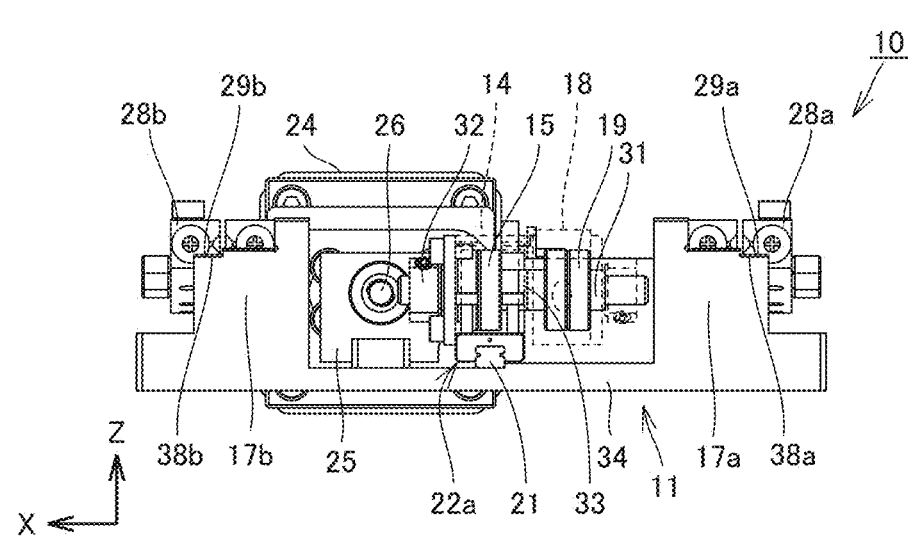
FIG. 8 is a schematic front view of the rocking table shown in FIG. 5.

FIG. 5 is a schematic perspective view of the rocking table of Embodiment 1 in the state in which a table portion, described later, has been removed, with some members represented by dashed lines. FIG. 6 is a schematic plan view of the rocking table shown in FIG. 5. FIG. 6 is a view of the rocking table shown in FIG. 5 in a direction indicated by arrow VI. FIG. 7 is a schematic side view of the rocking table shown in FIG. 5. FIG. 7 is a view of the rocking table shown in FIG. 5 in a direction indicated by arrow VII. FIG. 8 is a schematic front view of the rocking table shown in FIG. 5. FIG. 8 is a view of the rocking table shown in FIG. 5 in a direction indicated by arrow VIII.

Figure 9:
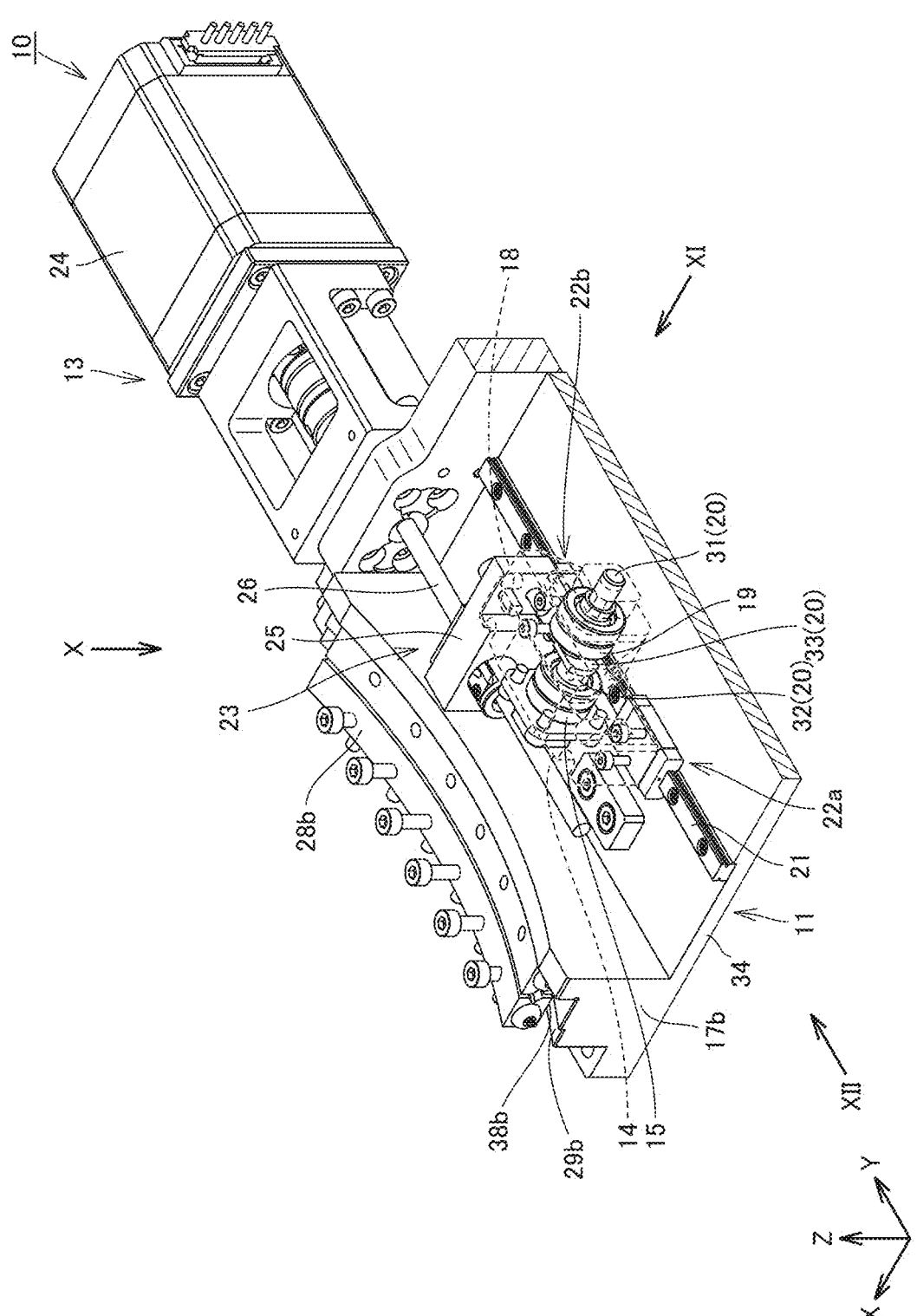
FIG. 9 is a schematic cross-sectional view of the rocking table shown in FIG. 5 when cut with the Y-Z plane including a base portion, described later.
Figure 10:
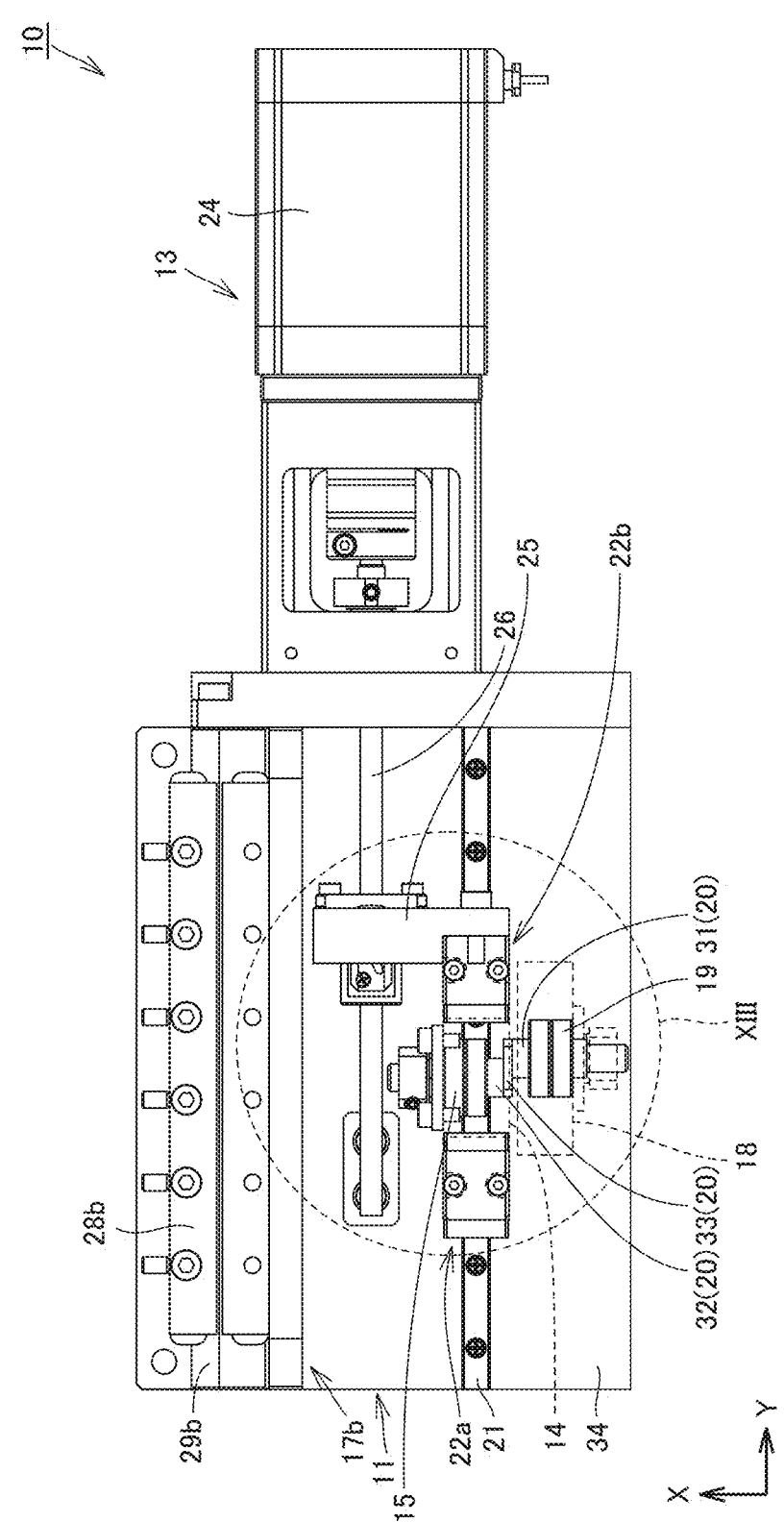
FIG. 10 is a schematic plan view of the rocking table shown in FIG. 9.
Figure 11:
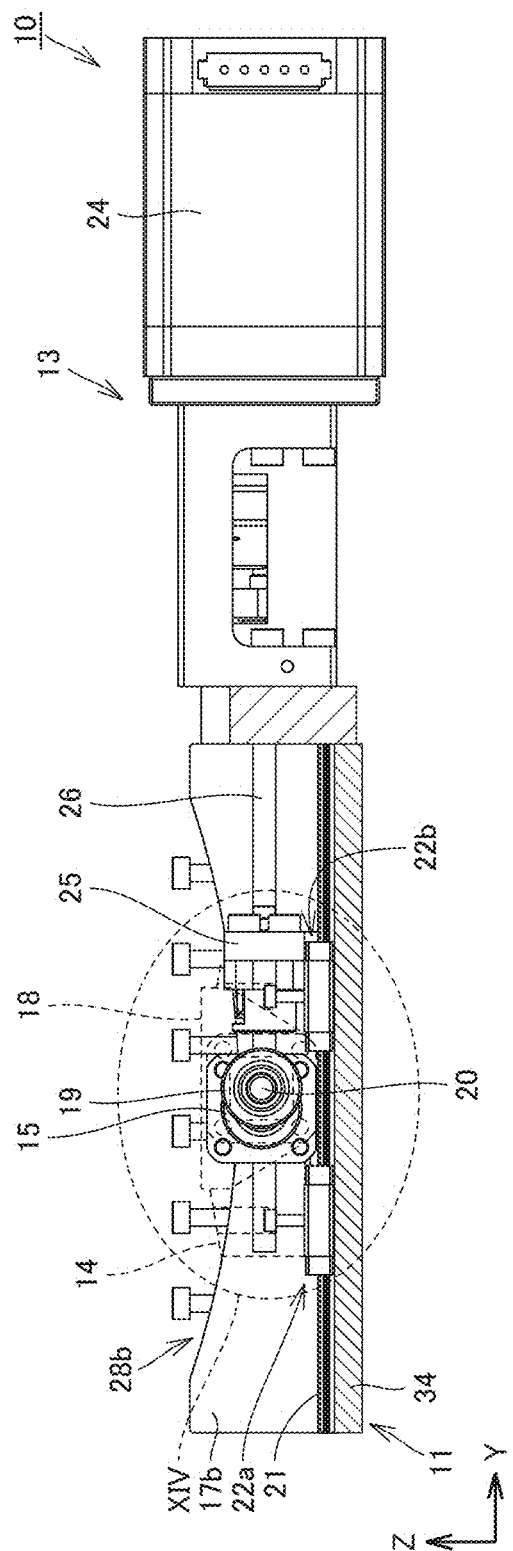
FIG. 11 is a schematic side view of the rocking table shown in FIG. 9.
Figure 12:
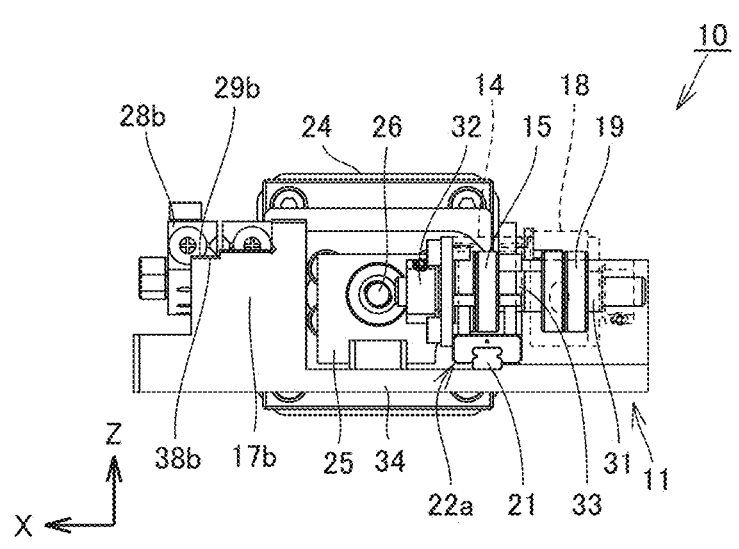
FIG. 12 is a schematic front view of the rocking table shown in FIG. 9.
Figure 13:
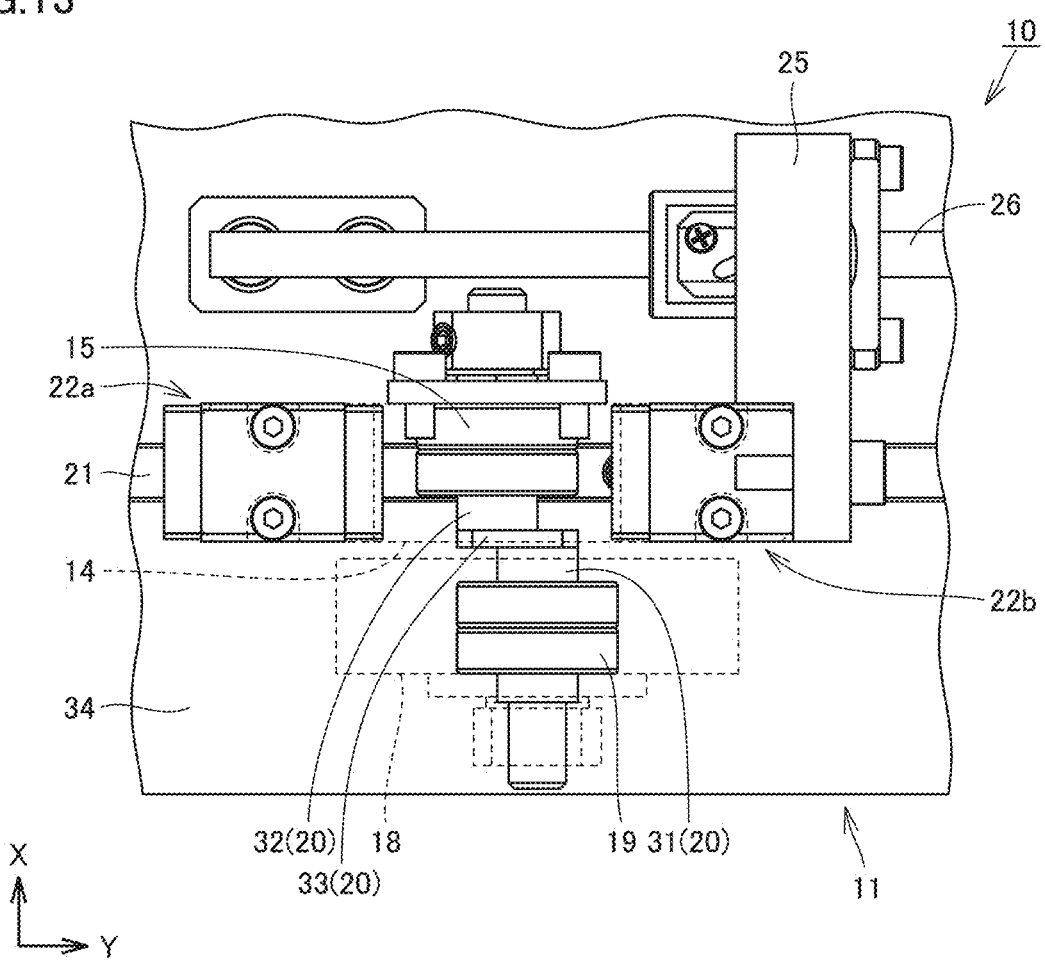
FIG. 13 is an enlarged view of the region XIII shown in FIG. 10.
Figure 14:
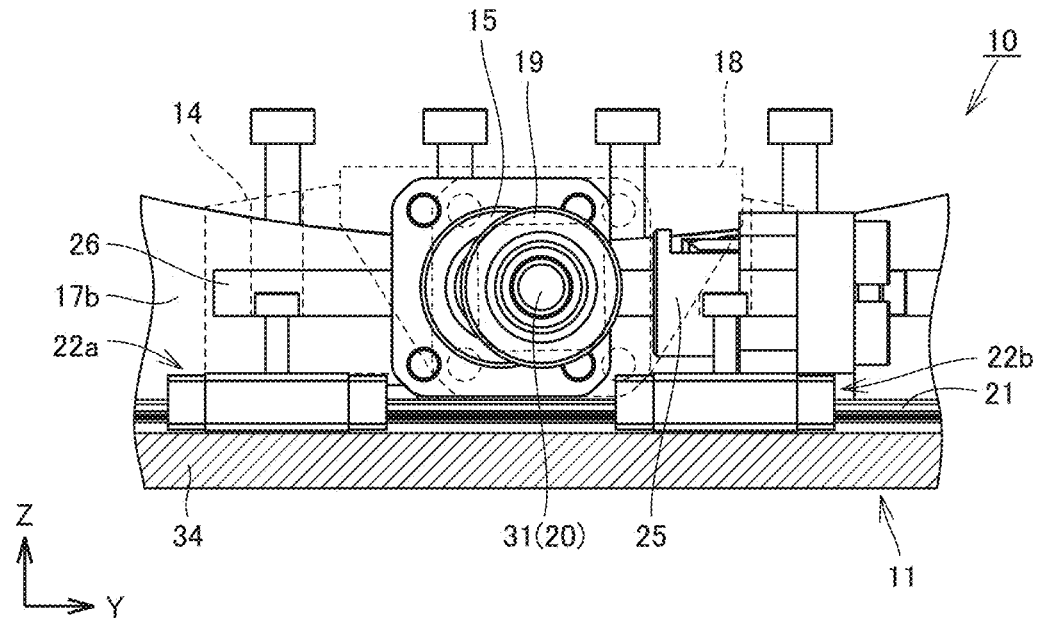
FIG. 14 is a schematic side view of the rocking table shown in FIG. 13.
Figure 15:
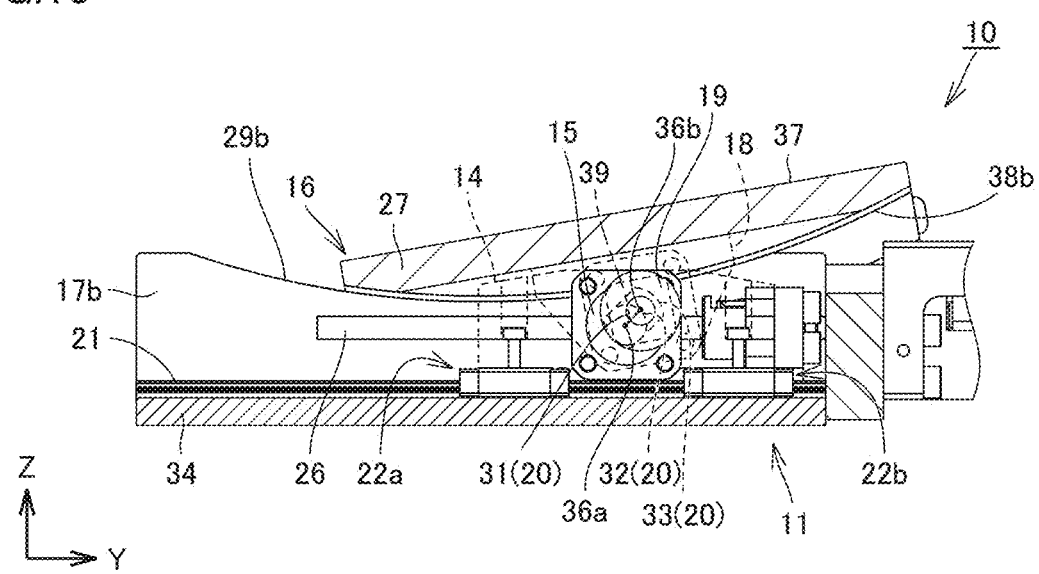
FIG. 15 is a schematic side view of the rocking table in the state in which a table portion, described later, is tilted by rocking.
Figure 16:
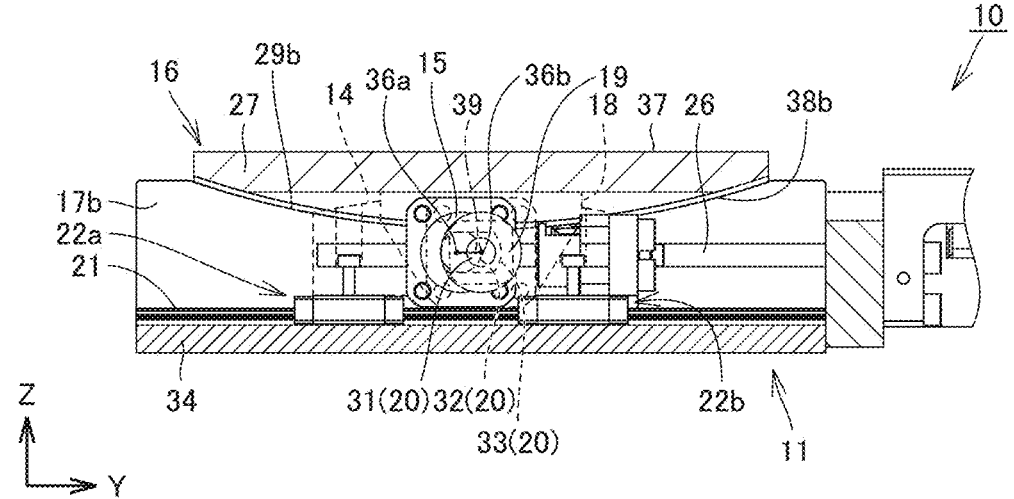
FIG. 16 is a schematic side view of the rocking table before tilting, i.e., in the state in which the table portion described later is horizontal.

FIG. 9 is a schematic cross-sectional view of the rocking table shown in FIG. 5 when cut with the Y-Z plane including a base portion, described later. FIG. 10 is a schematic plan view of the rocking table shown in FIG. 9. FIG. 10 is a view of the rocking table shown in FIG. 9 in a direction indicated by arrow X. FIG. 11 is a schematic side view of the rocking table shown in FIG. 9. FIG. 11 is a view of the rocking table shown in FIG. 9 in a direction indicated by arrow XI. FIG. 12 is a schematic front view of the rocking table shown in FIG. 9. FIG. 12 is a view of the rocking table shown in FIG. 9 in a direction indicated by arrow XII. FIG. 13 is an enlarged view of the region XIII shown in FIG. 10. FIG. 14 is a schematic side view of the rocking table shown in FIG. 13. FIG. 15 is a schematic side view of the rocking table in the state in which a table portion, described later, is tilted by rocking. FIG. 16 is a schematic side view of the rocking table before tilting, i.e., in the state in which the table portion described later is horizontal.

Referring to FIGS. 1 to 16, the rocking table 10 according to Embodiment 1 of the present disclosure includes a base portion 11, a linear motion mechanism 12, a driving source 13, a first support portion 14, a first rolling bearing 15, a table portion 16, a second support portion 18, a second rolling bearing 19, and an eccentric shaft 20. In the present embodiment, the first rolling bearing 15 and the second rolling bearing 19 are both angular bearings. The configuration of each member will now be described.

The base portion 11 is rectangular as viewed in the thickness direction, the Z direction. The base portion 11 is a portion serving as a base of the rocking table 10, to which each member is directly or indirectly attached. The base portion 11 includes a base plate 34 having a plate shape, and a pair of guide portions 17a and 17b.

The pair of guide portions 17a and 17b are formed integrally with the base plate 34. The guide portion 17a and the guide portion 17b are spaced apart in the X direction so as to sandwich a rail 21, described later, therebetween. The guide portion 17a and the guide portion 17b are each provided to rise from the base plate 34. The guide portion 17a has a guide surface 29a composed of a curved surface and in contact with a sliding surface 38a, described later. The guide portion 17b has a guide surface 29b composed of a curved surface and in contact with a sliding surface 38b, described later. The guide surfaces 29a and 29b are provided at ends in the Z direction of the guide portions 17a and 17b, respectively. The guide surface 29a and the guide surface 29b each have a circular arc shape as viewed in the X direction. The guide surface 29a and the guide surface 29b have the same curvature. The guide surface 29a and the guide surface 29b guide the table portion 16 during a rocking motion of the table portion 16.

The linear motion mechanism 12 is a linear motion guide unit in the present embodiment. The linear motion mechanism 12 includes a rail 21 and a plurality of sliders, two sliders 22a and 22b in the present embodiment. The rail 21 is attached so as to be mounted on the base portion 11, specifically on a central region in the X direction of the base plate 34, with the longitudinal direction being in the Y direction. The rail 21 is attached and fixed to the base plate 34 using a plurality of bolts. The rail 21 is provided with a rail raceway surface recessed along the longitudinal direction, on which rolling elements roll.

The slider 22a and the slider 22b are each attached to the rail 21. The slider 22a and the slider 22b are each provided with a slider raceway surface recessed along the longitudinal direction, on which rolling elements roll. A plurality of rolling elements, such as balls, are provided between the slider raceway surface of the slider 22a and the rail raceway surface. Similarly, a plurality of rolling elements, such as balls, are provided between the slider raceway surface of the slider 22b and the rail raceway surface. The linear motion mechanism 12, which is the linear motion guide unit, can cause the sliders 22a and 22b to smoothly perform a linear reciprocating motion in the longitudinal direction of the rail 21.

The driving source 13 causes the slider 22a and the slider 22b to perform a linear reciprocating motion. In the present embodiment, the driving source 13 includes a ball screw 23 and a motor 24. The ball screw 23 includes a ball screw nut 25 and a screw shaft 26. The screw shaft 26 is provided such that its longitudinal direction extends in the Y direction. The screw shaft 26 has a screw groove provided on its outside diameter surface. The screw shaft 26 is rotated by the motor 24. The ball screw nut 25 is attached to the screw shaft 26, and rolling elements (balls) are arranged between a raceway surface provided on the ball screw nut 25 and the screw groove. With the rotation of the screw shaft 26, the ball screw nut 25 performs a linear reciprocating motion in the Y direction, which is the longitudinal direction of the screw shaft 26.

The first support portion 14 is block-shaped and is attached to the ball screw nut 25. The first support portion 14 is attached so as to be mounted on the slider 22a and the slider 22b. That is, the ball screw nut 25, the first support portion 14, the slider 22a, and the slider 22b are configured to be attached to each other so as to move as a single unit. Rotation of the screw shaft 26 causes the ball screw nut 25, the first support portion 14 attached to the ball screw nut 25, and the slider 22a and the slider 22b attached to the first support portion 14 to move together to perform a linear reciprocating motion in the Y direction. The first support portion 14 is provided with a through hole penetrating in the X direction, and the first rolling bearing 15 is attached in this through hole. In the present embodiment, the first rolling bearing 15 is attached such that its outer ring is fitted into the through hole provided in the first support portion 14.

The table portion 16 is plate-shaped and is attached to cover the base portion 11 in the Z direction. The table portion 16 is capable of rocking with the power transmitted from the driving source. The table portion 16 includes a mounting portion 27 having a flat surface 37 that can be made parallel to the X-Y plane. The flat surface 37 of the mounting portion 27 is exposed in the Z direction. The surface of the mounting portion 27 on the side opposite to the flat surface 37 in the thickness direction comes to face the base portion 11. The rocking motion of the table portion 16 makes the flat surface 37 of the mounting portion 27 tilted with respect to the horizontal direction. The mounting portion 27 has, at both ends in the X direction, a flange portion 35a and a flange portion 35b which protrude toward the base plate 34 side. The flange portion 35a and the flange portion 35b have their end surfaces in the Z direction composed of curved surfaces. The end surface in the Z direction of the flange portion 35a and the end surface in the Z direction of the flange portion 35b each have a circular arc shape as viewed in the X direction.

The table portion 16 includes a sliding portion 28a having a sliding surface 38a composed of a curved surface. The table portion 16 includes a sliding portion 28b having a sliding surface 38b composed of a curved surface. The sliding portion 28a and the sliding portion 28b are each attached with bolts to the surface of the mounting portion 27 facing the base plate 34. In the present embodiment, the sliding portion 28a and the sliding portion 28b are each detachably attached to the mounting portion 27. The sliding portion 28a is arranged to contact the flange portion 35a. The sliding portion 28b is arranged to contact the flange portion 35b. The sliding surface 38a and the sliding surface 38b each have a circular arc shape as viewed in the X direction. The sliding surface 38a and the sliding surface 38b have the same curvature.

The second support portion 18 is attached to the table portion 16 to support the table portion 16. The second support portion 18 is attached to the surface of the mounting portion 27 of the table portion 16 facing the base plate 34. The second support portion 18 also has a block shape. Specifically, as viewed in the X direction, the second support portion 18 has a tapered portion whose width in the Y direction decreases as it approaches the base portion 11. The second support portion 18 is provided with a through hole penetrating in the X direction, and the second rolling bearing 19 is attached in this through hole. In the present embodiment, the second rolling bearing 19 is attached such that its outer ring is fitted into the through hole provided in the second support portion 18.

The eccentric shaft 20 is attached such that its axial direction is in the X direction. The eccentric shaft 20 includes a first shaft portion 31, a second shaft portion 32, and a connecting portion 33. The connecting portion 33 is plate-shaped and is provided to connect the first shaft portion 31 and the second shaft portion 32. The second shaft portion 32 is arranged eccentrically with respect to the first shaft portion 31. Specifically, an end in the X direction of the first shaft portion is connected to an end in the X direction of the second shaft portion 32 in a state where the centers of the shaft portions are offset, i.e., in an eccentric state. The eccentric shaft 20 rotates around the center 36b of the second shaft portion 32. In this case, the second shaft portion 32 performs a rotation motion. Since the second shaft portion 32 is arranged eccentrically with respect to the first shaft portion 31, the first shaft portion 31 performs a revolution motion around the center 36b of the second shaft portion 32. It should be noted that the center 36a of the first shaft portion 31 and the center 36b of the second shaft portion 32 are shown in FIGS. 15 and 16.

The eccentric shaft 20 is supported by the first rolling bearing 15 and the second rolling bearing 19. Specifically, the first shaft portion 31 of the eccentric shaft 20 is supported by the first rolling bearing 15, and the second shaft portion 32 of the eccentric shaft 20 is supported by the second rolling bearing 19. In the present embodiment, the first shaft portion 31 is fitted inside an inner ring included in the first rolling bearing 15. The second shaft portion 32 is fitted inside an inner ring included in the second rolling bearing 19. Here, the configuration is such that in the case where the table portion 16, or more specifically the flat surface 37 of the mounting portion 27, is horizontal as viewed in a horizontal direction, the direction in which a virtual line segment 39 connecting the center 36a of the first shaft portion 31 and the center 36b of the second shaft portion 32 extends is horizontal. The virtual line segment 39 is indicated by a long-dashed short-dashed line in FIGS. 15 and 16. When the flat surface 37 is tilted by the rocking of the table portion 16, this virtual line segment 39 is also tilted.

The operation of the rocking table 10 will now be described. The screw shaft 26 of the ball screw 23 rotates with the rotational force transmitted from the motor 24. As a result, the ball screw nut 25 attached to the screw shaft 26 performs a linear motion in the Y direction. In conjunction with this linear motion of the ball screw nut 25, the first support portion 14 also performs a linear motion. In response to this linear motion of the first support portion 14, the eccentric shaft 20 rotates. The rotation of the eccentric shaft 20 causes the table portion 16 to rock together with the second support portion 18 while being guided by the pair of guide surfaces 29a and 29b of the guide portions 17a and 17b. With the rocking of the table portion 16, the flat surface 37 of the mounting portion 27 is tilted.

According to the rocking table 10 with this configuration, the slider 22a and the slider 22b included in the linear motion mechanism perform a linear reciprocating motion with the power from the driving source 13. The first support portion 14 attached to the slider 22a and the slider 22b performs a linear reciprocating motion together with the slider 22a and the slider 22b. Then, the table portion 16 attached to the second support portion 18 via the eccentric shaft 20 performs a rocking motion in conjunction with the linear reciprocating motion of the first support portion 14. Here, the first shaft portion 31 of the eccentric shaft 20 is supported by the first rolling bearing 15, and the second shaft portion 32 of the eccentric shaft 20 is supported by the second rolling bearing 19. Such a configuration, as opposed to the sliding mechanism, facilitates life calculation based on fatigue of the rolling elements and the like. Furthermore, since the configuration adopts the first rolling bearing 15 and the second rolling bearing 19, unlike the case of the driving system adopting a worm gear, gaps do not occur, which makes it possible to perform accurate positioning of the table portion 16, and it is also suitable for high-speed operation. Accordingly, such a rocking table 10 facilitates life calculation, enables accurate positioning of the table portion 16, and allows appropriate high-speed operation.

In the present embodiment, the linear motion mechanism 12 includes the linear motion guide unit. This enables the table portion 16 to rock smoothly and positioning to be performed more accurately.

In the present embodiment, the first rolling bearing and the second rolling bearing are both angular bearings. This enables the table portion 16 to rock smoothly while the eccentric shaft 20 is properly supported, thereby enabling accurate life calculation.

In the present embodiment, the driving source 13 includes the ball screw 23 having the ball screw nut 25 attached to the first support portion 14 and the screw shaft 26, and the motor 24 which rotates the screw shaft 26. Thus, the rotational motion of the motor 24 can be converted into the linear motion of the sliders 22a and 22b to rock the table portion 16 more smoothly, and the rotation of the motor 24 can be controlled to enable high-speed operation and accurate positioning.

In the present embodiment, when the table portion 16 is in a horizontal position as viewed in the horizontal direction, the direction in which the virtual line segment 39 connecting the center 36a of the first shaft portion 31 and the center 36b of the second shaft portion 32 extends is horizontal. Thus, it is possible to ensure the stability of the rocking table 10 when the table portion 16 is in a horizontal position.

In the present embodiment, a plurality of sliders 22a and 22b, specifically two sliders, are provided. Thus, the plurality of sliders 22a and 22b can ensure an accurate linear reciprocating motion of the first support portion 14, thereby enabling more accurate positioning and high-speed operation.

In the present embodiment, the table portion 16 includes the sliding portion 28a having the sliding surface 38a composed of a curved surface, and the sliding portion 28b having the sliding surface 38b composed of a curved surface. The base portion 11 includes the guide portion 17a which guides the table portion 16, the guide portion 17a having the guide surface 29a composed of a curved surface and in contact with the sliding surface 38a, and the guide portion 17b which guides the table portion 16, the guide portion 17b having the guide surface 29b composed of a curved surface and in contact with the sliding surface 38b. Thus, the sliding portions 28a and 28b having the sliding surfaces 38a and 38b, respectively, and the guide portions 17a and 17b having the guide surfaces 29a and 29b, respectively, enable a smoother rocking motion of the table portion 16.

In the present embodiment, the guide portion 17a and the guide portion 17b are provided in a pair so as to sandwich the rail 21 therebetween. Thus, it is possible to guide the rocking table portion 16 more appropriately.

OTHER EMBODIMENTS

While the guide portion 17a and the guide portion 17b are provided in a pair to sandwich the rail 21 in the above embodiment, not limited thereto, either of the guide portions may be provided.

While a plurality of sliders 22a and 22b are provided in the above embodiment, not limited thereto, one slider may be provided.

In the above embodiment, the driving source 13 includes the ball screw 23 having the ball screw nut 25 attached to the first support portion 14 and the screw shaft 26, and the motor 24 rotating the screw shaft 26. The driving source 13, however, is not limited thereto and may use another mechanism capable of performing a linear reciprocating motion, e.g., a linear motor. Furthermore, although the linear motion guide unit is used as the linear motion mechanism in the above embodiment, it is not limited thereto, and another linear motion mechanism may be adopted.

It should be understood that the embodiments disclosed herein are illustrative and non-restrictive in every respect. The scope of the present invention is defined by the terms of the claims, and is intended to include any modifications within the scope and meaning equivalent to the terms of the claims.

REFERENCE SIGNS LIST

10: rocking table; 11: base portion; 12: linear motion mechanism; 13: driving source; 14: first support portion; 15: first rolling bearing; 16: table portion; 17a, 17b: guide portion; 18: second support portion; 19: second rolling bearing; 20: eccentric shaft; 21: rail; 22a, 22b: slider; 23: ball screw; 24: motor; 25: ball screw nut; 26: screw shaft; 27: mounting portion; 28a, 28b: sliding portion; 29a, 29b: guide surface; 31: first shaft portion; 32: second shaft portion; 33: connecting portion; 34: base plate; 35a, 35b: flange portion; 36a, 36b: center; 37: flat surface; 38a, 38b: sliding surface; and 39: virtual line segment.

The invention claimed is:

1. A rocking table comprising:
   a base portion;
   a linear motion mechanism including a rail attached to the base portion and a slider relatively movably attached to the rail;
   a driving source causing the slider to perform a linear reciprocating motion;
   a first support portion attached to the slider and performing a linear reciprocating motion together with the slider;
   a first rolling bearing attached to the first support portion;
   a table portion capable of performing a rocking motion with power transmitted from the driving source;
   a second support portion supporting the table portion;
   a second rolling bearing attached to the second support portion; and
   an eccentric shaft including a first shaft portion and a second shaft portion arranged eccentrically with respect to the first shaft portion, the first shaft portion being supported by the first rolling bearing, the second shaft portion being supported by the second rolling bearing.

2. The rocking table according to claim 1, wherein the linear motion mechanism includes a linear motion guide unit.

3. The rocking table according to claim 2, wherein at least one of the first rolling bearing and the second rolling bearing includes an angular bearing.

4. The rocking table according to claim 2, wherein the driving source includes
   a ball screw having a ball screw nut attached to the first support portion and a screw shaft, and
   a motor operable to rotate the screw shaft.

5. The rocking table according to claim 2, wherein in the case where the table portion is horizontal as viewed in a horizontal direction, a direction in which a virtual line segment connecting a center of the first shaft portion and a center of the second shaft portion extends is horizontal.

6. The rocking table according to claim 2, wherein a plurality of the sliders are provided.

7. The rocking table according to claim 2, wherein
   the table portion includes a sliding portion having a sliding surface composed of a curved surface, and
   the base portion includes a guide portion that guides the table portion, the guide portion having a guide surface that is composed of a curved surface and is in contact with the sliding surface.

8. The rocking table according to claim 7, wherein a pair of the guide portions are provided to sandwich the rail therebetween.

9. The rocking table according to claim 1, wherein at least one of the first rolling bearing and the second rolling bearing includes an angular bearing.

10. The rocking table according to claim 1, wherein the driving source includes
   a ball screw having a ball screw nut attached to the first support portion and a screw shaft, and
   a motor operable to rotate the screw shaft.

11. The rocking table according to claim 1, wherein in the case where the table portion is horizontal as viewed in a horizontal direction, a direction in which a virtual line segment connecting a center of the first shaft portion and a center of the second shaft portion extends is horizontal.

12. The rocking table according to claim 1, wherein a plurality of the sliders are provided.

13. The rocking table according to claim 1, wherein
   the table portion includes a sliding portion having a sliding surface composed of a curved surface, and
   the base portion includes a guide portion that guides the table portion, the guide portion having a guide surface that is composed of a curved surface and is in contact with the sliding surface.

14. The rocking table according to claim 13, wherein a pair of the guide portions are provided to sandwich the rail therebetween.

\* \* \* \* \*